United States Patent [19]

Mixon, Jr.

[11] 4,405,827
[45] Sep. 20, 1983

[54] ELECTRICAL CONNECTOR
[75] Inventor: James L. Mixon, Jr., Harrisburg, Pa.
[73] Assignee: AMP Incorporated, Harrisburg, Pa.
[21] Appl. No.: 276,306
[22] Filed: Jun. 22, 1981
[51] Int. Cl.³ .............................................. H01R 4/20
[52] U.S. Cl. ................................ 174/94 R; 174/84 C; 174/87; 403/391
[58] Field of Search ...................... 174/94 R, 84 C, 87; 24/129 W; 403/391, 398, 399; 339/276 R; 52/684, 685, 686, 719

[56] References Cited

U.S. PATENT DOCUMENTS

| 683,672 | 10/1901 | Wellman | 403/396 |
|---|---|---|---|
| 2,307,216 | 1/1943 | Graham | 339/276 R |
| 2,760,798 | 8/1956 | Evans . | |
| 3,183,025 | 5/1965 | Lynch, Jr. et al. . | |
| 3,255,565 | 6/1966 | Menzel | 52/684 X |
| 4,302,124 | 11/1981 | Wilks | 403/391 |

FOREIGN PATENT DOCUMENTS 251253 12/1966 Austria ................................ 52/685

Primary Examiner—A. T. Grimley
Assistant Examiner—D. A. Tone
Attorney, Agent, or Firm—Allan B. Osborne

[57] ABSTRACT

This invention relates to electrical connectors and more particularly to a connector for compression-formed parallel, X- and T-tap connections. The connector disclosed herein is a single piece member having wire-receiving passages adjacent each end. Slots parallel to and extending outwardly from the passages through the end sections define walls or fingers which may be closed in towards each other and the passages to crimp wires which may be positioned therein.

1 Claim, 5 Drawing Figures

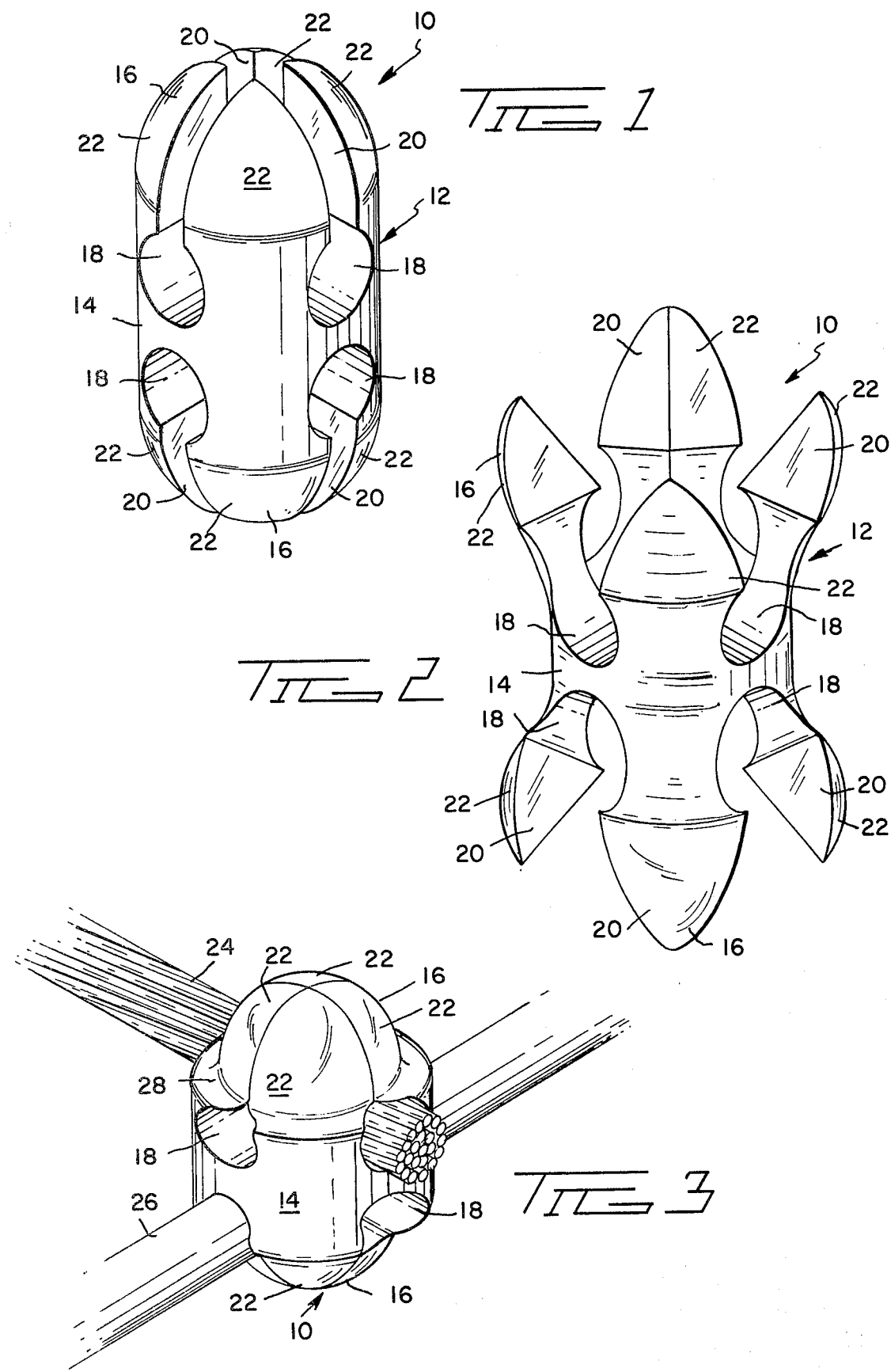

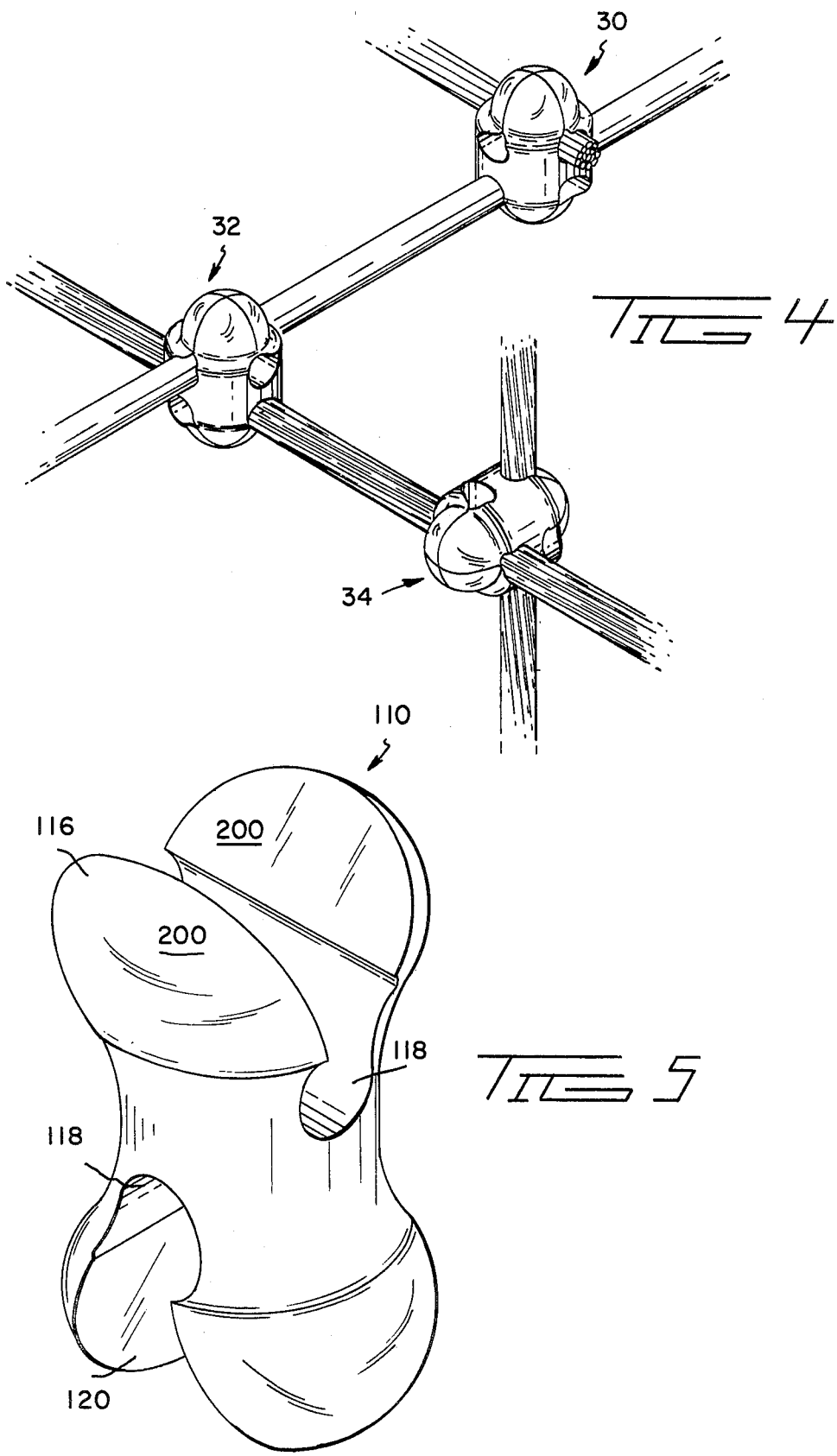

ELECTRICAL CONNECTOR

The invention disclosed herein relates to electrical connectors wherein wires are connected by compressing or crimping fingers or walls in over the wires which are positioned in passages.

U.S. Pat. No. 2,760,798 discloses a connector stamped from a blank into a H-shape. This is then formed up into a U-shaped ferrule. The legs are brazed together to form a tubular ferrule with a slot, perpendicular to the longitudinal axis, provided between the legs. One wire is laid into the slot and a second wire is threaded through the closed legs over the first wire. Pressure on the top and bottom of the ferrule buckle the legs down so that the ferrule is compressed into a solid mass having good mechanical properties. The two wires are somewhat deformed and forged to the connector to provide excellent electrical contact.

The present invention discloses a connector for electrically connecting two wires which may be positioned parallel or at right angles to each other. In one embodiment, the connector body has a cylindrical midsection and rounded end sections. Two circular passages, one perpendicular to the other extend through the midsection immediately adjacent each end section. Slots, parallel to and intersecting the passages, extend outwardly through the end sections to provide four fingers. With wires laid in one passage at each end of the connector, the connector is crimped onto the wires by compressing the fingers in towards each other and the passages.

A second embodiment is shown where only one passage is provided adjacent each end section and one slot bisects that section.

FIG. 1 is a perspective view of the connector of the present invention prior to the final forming operation;

FIG. 2 is a perspective view of the connector of FIG. 1 subsequent to the final forming operation;

FIG. 3 is a perspective view of the connector of FIG. 2 subsequent to crimping a pair of wires therein;

FIG. 4 is a perspective view showing the various ways in which the connector of the present invention can be used; and FIG. 5 is a perspective view of an alternate embodiment of the present invention.

FIG. 1 shows connector 10 in an uncomplete stage in the manufacturing thereof so that the several structures can be more clearly pointed out. The connector is made from suitable conductive material. The connector body 12 is elongated, preferably cylindrical through midsection 14 and has parabola-shaped or rounded end sections 16. Circular passages 18 extend through the midsection adjacent each end section 16. Preferably, there is a set of two such passages, one passage of the set being perpendicular to the other passage and with both intersecting one another. The diameter of the passages in any one set are preferably the same.

Slots 20, each parallel to and intersecting a passage 18, extend outwardly through end sections 16. These slots divide the end sections into four fingers 22 in the embodiment of FIGS. 1-4.

FIG. 2 is a perspective view of connector 10 of FIG. 1 after final forming; i.e., fingers 22 have been spread out much like the petals of a tulip. The degree of spreading is little more than needed to position a wire in a passage 18. After wires have been positioned in one passage of each set at each end section, fingers 22 are crimped or compressed in down over them as shown in FIGS. 3 and 4. Preferably, the fingers are forced completely together which reduces the dimension of end sections 16 and squeezes or crimps the wires in passages 18. A suitable tool (not shown) for closing the fingers would be one having cup-shaped dies movable towards each other so that with connector 10 positioned in between, the dies would compress or crimp the fingers in towards each other and particularly towards the passages, the result being that the wires are crimped in the passages and the connector's overall length has been reduced. An important point with regard to this connector and the method of crimping the wires therein is that it takes only one compressing stroke of the tool to make the double connection.

With specific reference to FIG. 3, a stranded wire 24 and solid wire 26 have been connected electrically and secured mechanically together. Note how, in compressing the fingers in towards each other and towards passages 18, the passages have been distorted and reduced in size by the compressing action. The rim 28 next to the passages is the result of the compressive forces exerted in crimping the wires.

FIG. 4 shows three connections to demonstrate the versatility of connector 10. In case 30, the connection is a T-tap. In case 32, both wires are horizontal and are perpendicular one to the other. In case 34, one wire is horizontal and the second wire is vertical. Not shown is the case both wires are parallel one to the other; e.g., as in a splice.

FIG. 5 illustrates a second embodiment of the present invention. This connector, indicated by reference numeral 110 has one passage 118 and one slot 120 adjacent and through each end section 116. The slot bisects each end section to provide two opposing walls 200 which are closed in on the wires in the passages in the same manner as fingers 22. Note that the passages in the connector shown extend perpendicular, one to the other. Obviously, they can be made to extend in other relative directions.

The preferred material used in making connector 10 or 110 is copper or aluminum alloy. The method of making preferably would be by casting in the final form of FIG. 2 or FIG. 5. The passages of any one set are preferably sized for a single wire size. However, the passage diameter on one end of a connector can differ from the diameter of the passage set on the opposite end so that two wires of different gauges can be connected together.

The present invention may be subject to many modifications and changes without departing from the spirit or essential characteristics thereof. The present embodiment is therefore intended in all respects as being illustrative and not restrictive of the scope of the invention.

I claim:

1. An electrical connector for connecting two wires together, comprising an elongated body of conductive material having a midsection and end sections with two circular passages extending through the midsection adjacent each end section with one passage being perpendicular to and intersecting the other passage, and further, slots parallel to and extending from intersection with the passages outwardly through the end sections to define four fingers, said fingers being adapted to be compressed in towards each other and the passages to thereby crimp wires which may be positioned therein.

* * * * *